United States Patent Office 2,846,310
Patented Aug. 5, 1958

2,846,310

PRODUCTION OF A VITAMIN CONTAINING NUTRITIONAL COMPOSITION CONTAINING ANTIBIOTICS

Harlow H. Hall and Robert G. Benedict, Peoria, Ill., assignors to the United States of America as represented by the Secretary of Agriculture No Drawing. Application December 7, 1954
Serial No. 473,763

2 Claims. (Cl. 99—9)

(Granted under Title 35, U. S. Code (1952), sec. 266)

A nonexclusive, irrevocable, royalty-free license in the invention herein described, throughout the world for all purposes of the United States Government, with power to grant sublicenses for such purposes, is hereby granted to the Government of the United States of America.

This invention relates to the production of nutritional compositions having two biologically important ingredients, the growth-stimulating substance vitamin $B_{12}$, and an antibiotic complex. It relates more particularly to such a composition which is particularly suitable for use in animal feeds and to fermentation methods for its production.

This invention is based upon the discovery that a particular microorganism, *Streptomyces griseus forma farinosus* f. nov. NRRL B–1354 elaborates a complex of antibiotics consisting of streptothricin, streptolins A and B, a factor $X_2$ of Peterson et al., and vitamin $B_{12}$.

*Streptomyces griseus forma farinosus* f. nov. NRRL B–1354 was isolated in 1948 from a sample of soil. When cultured on a number of different media, the organism produces a mealy, white aerial mycelium with the reverses varying from pale yellow to pale orange-brown. Ovoid conidia are produced in long straight chains and no spirals are observed. It is quite different physiologically from that of the streptolin-forming strain of Rivett and Peterson, NRRL B–1363, but four of the six antibiotics produced seem to be identical with those formed by strain B–1363.

When it was grown in shaken-flask cultures on media containing cobaltous chloride, distillers' solubles, corn steep and glucose, or hexane-extracted peanut meal or soybean meal and glucose, vitamin $B_{12}$ yields in the range of 0.2–0.6 µg./ml. were obtained. Assays were made by a method which was essentially that of Skeggs et al., using *Lactobacillus leichmannii*, ATCC 4797.

It produces a complex of antibiotics in shaken-flask cultures. When culture liquors of this organism and the streptolin producer of Rivett and Peterson are compared by the ion-exchange chromatography system of Larson et al., the results shown in Table 1 are obtained.

TABLE 1

*Ion-exchange chromatography of culture liquors from Streptomyces griseus forma farinosus f. nov. NRRL B–1354 and (NRRL B–1363) of Rivett and Peterson*

| Zone | 6 | 5 | 4 | 3 | 2 | 1 | Comparative activity of cultures, percent |
|---|---|---|---|---|---|---|---|
| Culture and mediums: | | | | | | | |
| B–1354—Peanut meal medium, Fernbachs. | $X_2$ | Streptolin A | Streptolin B | 3rd runner | Streptothricin | Front runner. | 100 |
| B–1354—Streptolin production medium, 500 ml. Erlenmeyers. | $X_2$ | ----do------ | ----do------ | ----do---- | ----do------ | | 60 |
| B–1363—Peanut meal medium, Fernbachs. | | | ----do------ | $X_1$ | ----do------ | | 15 |
| B–1363—Streptolin production medium, 500 cc. Erlenmeyers. | $X_2$ | Streptolin A | ----do------ | $X_1$ | ----do------ | | 100 |

Crude broths were spotted on sodium sulfate-bisulphite-treated paper strips and resolved for 65 hours in a 75-percent ethanol-sodium chloride system. The strips were then dried, placed on agar trays, seeded with *Bacillus subtilis* spores with, and without, 1-percent NaCl added to the assay agar.

The unidentified third number in the table produced by NRRL B–1354 appears to differ from factor $X_1$ mentioned by Larson et al. In the present invention the complex of antibiotics and vitamin $B_{12}$ has been found to possess superior weight-gaining properties when the fermentation product is used as a feed supplement. We have found that the specific pattern of antibiotic content may be altered slightly by altering the medium; the net effect on vitamin-$B_{12}$ activity appears to be unchanged.

The morphological and cultural characteristics of the organism used in accordance with this invention are set forth below:

*STREPTOMYCES GRISEUS FORMA FARINOSUS* F. NOV.
(NRRL B–1354)

The cultural characteristics of this form approach those of *Streptomyces griseus* (Krainsky emend. Waksman and Curtis) Waksman and Henrici differing in several particulars such as tints and shades of color of aerial mycelia and colony reverses of sporulating cultures, and in certain physiological reactions, but more particularly in the production of antibiotic factors not identifiable with streptomycin, grisein, cycloheximide or any other antibiotics attributed to strains of S. griseus. The characteristics of this form also can be related to certain inadequately described species, e. g., S. farinosus (Krassilnikov) comb. nov. This specie, however, may represent nothing more than a strain of S. griseus.

The characteristics of this form are given below in tabular form and are derived from application of general techniques outlined by Hesseltine, Benedict and Pridham, Annals N. Y. Acad. Sci., 60, 136–151 (1954). Readings are based on a number of separate experiments. All cultures were incubated for 14 days at 28–30° C. The colors, where R is indicated, are those of Ridgway, Color Standards and Nomenclature, 1912.

A culture of the living organism has been deposited with the Northern Utilization Research Branch, Agricultural Research Service, U. S. Department of Agriculture, at Peoria, Illinois, and has been added to its permanent collection of microorganisms as NRRL B–1354.

and salicin; sparse utilization of raffinose, lactose, inulin, and DL-inositol; non-utilization of L-arabinose, rhamnose, and sucrose; and production of vitamin $B_{12}$ and antibiotic factors including streptothricin, streptolin A, and streptolin B, not identified with streptomycin or other antibiotics produced by strains of Streptomyces griseus or species relation to S. griseus.

In employing our fermentatioan product as a feed supplement we prefer to mix it with the dry feed, in direct proportion to its vitamin-$B_{12}$ content. We add the fermentation product in an amount which will give about 1 to 4 μg. of vitamin $B_{12}$ for each 100 g. of feed. For the sake of convenience we express this proportion as 1 to 4 μg. percent. It will be understood, however, that there are a plurality of ways in which the fermentation product may be added to animal feed, and that the proportions may vary over wide limits depending upon the specific requirements of the animals to be fed. For example, it may be added as a concentrated solution to a mash, or it may be added as the concentrated or unconcentrated culture media to a feed, and the resulting mash or slurry dried.

The organism of this invention may be cultured on

STREPTOMYCES GRISEUS FORMA FARINOSUS F. NOV. (NRRL–1354)

| Medium | Amount of Growth | Degree of Sporulation | Color | | Morphology (× 400) |
|---|---|---|---|---|---|
| | | | Aerial mycelium and Spores | Reverse | |
| Emerson's agar | Excellent | Moderate to Excellent. | Near Cartridge Buff R., Pl. XXX. | Near Honey Yellow R., Pl. XXX. | Flexuous. |
| Czapek's solution agar | Fair | Excellent | Near Ivory Yellow R., Pl. XXX. | Near Ivory Yellow R., Pl. XXX. | Do. |
| Synthetic starch-agar | do | Fair | Near Cartridge Buff R., Pl. XXX. | Near Buff-Yellow R., Pl. IV. | Do. |
| Potato-dextrose agar | Excellent | Excellent | Near Olive-Buff R., Pl. XL. | Near Chamois R., Pl. XXX. | Do. |
| Carvajal's oatmeal-agar | Fair | Fair | Near Ivory Yellow R., Pl. XXX. | (not observed) | Do. |
| Berger's tomato-paste agar | Excellent | Excellent | Near Cartridge Buff R., Pl. XXX. | do | Do. |
| Asheshov et al. tomato paste oatmeal agar. | Moderate | Moderate | Near Olive-Buff R., Pl. XL. | do | Do. |
| Hickey and Tresser's amidex agar | Fair | Poor | Near Cartridge Buff R., Pl. XXX. | Near Tawny-Olive R., Pl. XXIX. | Do. |

Sporophores in sporulating cultures measure approximately 2μ×50–75μ are of a flexuous nature and often occur in tufts arising from the surface of agar media. Spores are spherical to avoid and measure approximately 0.75μ x 1μ. Spores occur in long chains often constituting the entire length of the sporophore.

The organism exhibits a number of physiological characteristics which also serve to identify it and to separate it from other described species and forms of streptomycetes. It utilizes trehalose, L-xylose, D-glucose, D-fructose, maltose, D-mannitol, salicin, dextrin, and starch when incorporated in the carbon-free basal agar medium of Pridham and Gottlieb, employing a 10-day incubation at 28° to 30° C. It utilizes adonitol, D-sorbitol, lactose, melibiose, melizitose, inulin, and DL-inositol sparingly and does not utilize L-arabinose, rhamnose, L-sorbose, sucrose, or erythritol under the same experimental conditions. It also possesses the ability to blacken peptone iron agar indicating the probable production of hydrogen sulphide.

The form name (Streptomyces griseus forma farinosus f. nov.) is derived from a contraction of streptothricin and streptolin, the two principal antibiotic components produced by this form under appropriate conditions.

Characteristics of the organism considered to be of taxonomic significance include the flexuous nature of the sporophores; colors of the aerial mycelia near Cartridge Buff (R), Ivory Yellow (R), and Olive Buff (R); reverse colors near Honey Yellow (R), Ivory Yellow (R), Buff Yellow (R), Chamois (R), and Tawny Olive (R); blackening of peptone iron agar; utilization of L-xylose relatively inexpensive media comprising a source of assimilable nitrogen such as soybean meal, cotton seed meal, peanut meal, distillers' solubles, and the like, or mixtures of any of these ingredients. The amount of assimilable nitrogen source in the culture media may be from 2 to 8 percent of that media. We prefer to use an aqueous solution containing about 3.5 percent.

The duration of the fermentation should be at least about 48 hours. We have found that the fermentation may be permitted to continue for periods up to 120 hours. The upper limit of duration does not appear to be critical, except that on long periods there is the slight loss in antibiotic activity. We have found, from economic considerations, it is probably best to limit the fermentation to not more than 96 hours, but this limit may be larger or smaller, depending upon the specific plant installation and the economic factors which govern the operation.

The medium also should contain a source of assimilable carbon such as glucose, sucrose, starch, molasses, and the like. It should also contain minor amounts of the essential nutrient minerals such as potassium, phosphorus, iron, zinc, and manganese. The medium requires a small amount, 1 to 10 p. p. m., of cobalt for satisfactory production of vitamin $B_{12}$.

The following examples illustrate pilot-plant and commercial scale production runs of the fermentation product.

EXAMPLE 1

Streptomyces griseus forma farinosus f. nov. NRRL B–1354, was grown in 300 gallons of the aqueous medium in a 600-gallon fermentor. The medium had the following composition:

| | |
|---|---|
| Soybean meal | 2%. |
| Distillers' solubles | 1%. |
| Glucose | 1%. |
| $K_2HPO_4$ | 0.2%. |
| NaCl | 0.2%. |
| $CoCl_2.6H_2O$ | 2 p. p. m. |
| $FeSO_4$ | To give 0.1 mg. Fe per 100 ml. |
| $ZnSO_4.7H_2O$ | To give 0.1 mg. Zn per 100 ml. |
| $MnSO_4.H_2O$ | To give 4.0 mg. per 100 ml. |

After 90 hours, the whole beer containing 2.5 percent solids was evaporated to 20-percent solids in vacuo at 54.5°–60° C. (130°–140° F.) and drum-dried at 40–50 pounds steam pressure. The final product contained 1.4 mg. per pound (3 $\mu$g./g.) of vitamin $B_{12}$ and antibiotic equivalent to 115 mg. of streptothricin per pound.

EXAMPLE II

A 4,210-gallon run was made on a medium containing 2 percent soy meal, 1 percent distillers' solubles, 1 percent cerelose, mineral salts, and 2 p. p. m. of cobaltous chloride. The whole beer was harvested at 115 hours and the dried product contained 3.9 mg. per pound (8.5 $\mu$g./g.) vitamin $B_{12}$ and antibiotic equivalent to 680 mg. streptothricin per pound.

Feeding trials of these products were conducted with White Rock male chicks at Michigan State College. In the tests, day-old, male White Rock chicks were placed on an accelerated assay test, wherein the period used to establish gains was 7–22 days. The effect of supplementing the diets with crystalline $B_{12}$ and penicillin were compared with that of the fermentation product of Streptomyces griseus forma farinosus f. nov. NRRL B–1354 at two antibiotic levels.

In the tests, groups A, B, and C, were used for comparison purposes. Group A was given a vitamin-$B_{12}$ deficient basal ration. The same ration was given to group B, except that 0.002 percent procaine penicillin was added. Group C was fed the same basal ration to which the same amount of procaine penicillin and 3 $\mu$g. percent of crystalline vitamin $B_{12}$ were added.

The birds of group D were given the basal ration to which 0.002 percent procaine penicillin and 3 $\mu$g. percent of the fermentation product of Example I were added.

The birds of group E were given the same ration as those of group D, except that the fermentation product of Example II was substituted for that of Example I.

The birds of group F were fed the basal ration to which 1.5 $\mu$g. percent of the fermentation product of Example I was added.

At the end of 4 weeks, birds of group A had required 2.51 pounds of feed per pound of gain; those of group B had required 2.65 pounds; while those of group C had required 2.29 pounds. In contrast to these gains, the girds in groups D, E, and F had required 2.15, 2.04, and 2.23 pounds, respectively.

We claim:

1. The method of producing a nutritional composition containing vitamin $B_{12}$ and antibiotic activity which comprises culturing Streptomyces griseus forma farinosus f. nov. NRRL B–1354 in an aqueous medium comprising soybean meal, glucose, mineral salts, and the cobalt ion; permitting the fermentation to continue for a period of at least 48 hours; and admixing the resulting fermentation mixture with an animal-feed substance.

2. An animal feed containing a nutritional composition containing an appreciable quantity of vitamin $B_{12}$ and antibiotic activity, said nutritional composition being produced by culturing Streptomyces griseus forma farinosus f. nov., NRRL B–1354 in an aqueous medium comprising a source of assimilable nitrogen, glucose, mineral salts, and the cobalt ion; permitting the fermentation to continue for a period of at least 48 hours; and recovering the solids from the fermentation liquor, said solids containing said vitamin $B_{12}$ and said antibiotic activity.

References Cited in the file of this patent

UNITED STATES PATENTS

| | | |
|---|---|---|
| 2,619,420 | Jukes | Nov. 25, 1952 |
| 2,643,213 | Hall | June 23, 1953 |
| 2,681,881 | Bennett | June 22, 1954 |
| 2,703,303 | Rickes et al. | Mar. 1, 1955 |